United States Patent
Bacardit

(10) Patent No.: US 6,655,139 B2
(45) Date of Patent: Dec. 2, 2003

(54) SERVOMOTOR WITH A FINGER-FORMING LOCKING SLEEVE

(75) Inventor: Juan Simon Bacardit, Barcelona (ES)

(73) Assignee: Bosch Sistemas de Frenado, S.L., Barcelona (ES)

( * ) Notice: Subject to any disclaimer, the term of this patent is extended or adjusted under 35 U.S.C. 154(b) by 0 days.

(21) Appl. No.: 09/857,330

(22) PCT Filed: Apr. 19, 2001

(86) PCT No.: PCT/FR01/01200

§ 371 (c)(1),
(2), (4) Date: Jun. 4, 2001

(87) PCT Pub. No.: WO01/89899

PCT Pub. Date: Nov. 29, 2001

(65) Prior Publication Data

US 2003/0085614 A1 May 8, 2003

(30) Foreign Application Priority Data

Apr. 21, 2000 (WO) .............................. PCT/FR00/05668

(51) Int. Cl.$^7$ .............................................. B60T 13/20
(52) U.S. Cl. ............................................ 60/553; 60/574
(58) Field of Search ........................... 60/552, 553, 574

(56) References Cited

U.S. PATENT DOCUMENTS 6,085,522 A * 7/2000 Simon Bacardit ............ 60/553

FOREIGN PATENT DOCUMENTS

| DE | 197 55 442 | * 6/1999 |
| DE | 199 02 710 | * 11/1999 |
| WO | WO01/89899 | * 11/2001 |

* cited by examiner

Primary Examiner—Matthew C. Graham
(74) Attorney, Agent, or Firm—Leo H. McCormick, Jr.; Warren Comstock

(57) ABSTRACT

A pneumatic servomotor for an assisted braking of a motor vehicle having a unidirectional clutch device (56). The clutch device (56) has a coaxial sleeve (58) that slides on a plunger (46), and a substantially ring-shaped key (60) that is arranged with a given clearance around the sleeve (58) and driven by a moving piston (22). When an input force is applied at a determined speed onto a control rod (38) that is integral with the plunger (46), the key (60) rocks and locks a finger (52) that biases the piston (22) with respect to the sleeve (58) in an axial position. The key (60) includes a peg (78) for axial indexing of the locking position of the sleeve (58).

10 Claims, 5 Drawing Sheets

SERVOMOTOR WITH A FINGER-FORMING LOCKING SLEEVE

This invention relates to a pneumatic servomotor used for assisting in the braking of a motor vehicle.

More particularly, the present invention relates to a pneumatic servomotor for an assisted braking of a motor vehicle, of the type comprising a rigid casing, in which a transverse partition wall is movable, thus defining in an airtight manner a front chamber under a first engine negative pressure, and a rear chamber under a second pressure, varying between the engine negative pressure and the atmospheric pressure; of the type including a moving piston, integral with the moving partition wall, and a control rod, moving inside the piston, in a selective manner as a function of an axial input force, exerted in the forward direction against a return force applied to the rod by a return spring; of the type according to which the control rod is biased towards either an intermediate actuation position or an end actuation position, resulting from the applying of the input force at a determined high speed; of the type comprising a plunger, arranged at the front part of the control rod inside the piston, and a three-way valve, including at least an annular seat borne by a rear section of the plunger, and capable of varying the second pressure, prevailing within the rear chamber, particularly by connecting the front chamber with the rear chamber when the control rod is in the rest position, or by gradually connecting the rear chamber with the atmospheric pressure when the control rod is actuated; of the type in which, in the end actuation position of the control rod, a finger, which is slidingly fitted on the front end of the plunger, is biased by the plunger into contact with a reaction disk, integral with the rear face of the moving piston, so as to transmit the reaction force of the moving piston to the plunger and to the control rod; and of the type comprising a unidirectional clutch device, which includes a coaxial sleeve, sliding on the plunger, and a substantially ring-shaped key, arranged with a given clearance around the sleeve and capable of being driven by the moving piston when the input force is applied at said determined speed, so as to rotate on a generally transverse axis in order to cooperate with the periphery of the sleeve and lock it in an end front axial position, in which it locks the finger, independently of the plunger and of the control rod.

In a well-known manner, such a design is most suitable as regards safety, in the case of an emergency braking situation.

As a matter of fact, a conventional servomotor comprises neither an independent finger nor a unidirectional clutch device for the finger. A finger-forming end section of the plunger is likely to bias directly the reaction disk, integral with the rear face of the moving piston.

In a full-braking situation, in which case a maximum braking force is applied on the control rod, the actuation of the control rod causes the finger-forming plunger to be actuated, which fact results in the maximum opening of the three-way valve and, therefore, the rear chamber is subjected to the atmospheric pressure. Thus, the moving partition wall travels forward and the end of the plunger contacts the reaction disk, integral with the rear face of the moving piston.

Therefore, the force, which is applied onto the moving piston when the control rod reaches the end of its stroke, results from the assisting force, arising from the pressure difference between each side of the moving partition wall, and from the force exerted by the finger-forming plunger onto said moving piston. Besides, the driver feels the braking reaction force, which is transmitted from the moving piston to the plunger, through the reaction disk.

As a matter of fact, it has been established that quite a number of drivers, when confronted with an emergency braking situation, underestimated the risks actually incurred and, after having jammed the brakes on, would somewhat release the braking force at the very time when a braking force should have been maintained in order to avoid an accident.

In the case of a full-braking situation, accompanied by the swift travel of the control rod, the plunger may touch the reaction disk and therefore give the driver the feeling of a maximum braking action even before the pressure difference between the front and rear chambers actually reaches its maximum value, which may lead the driver to release the braking force even though it should be maintained so as to profit by the maximum braking force.

A servomotor, like that of the above-described type, makes it possible to eliminate such a disadvantage, in that the plunger is locked into contact with the reaction disk, by means of the sleeve, which results in a maximum force being maintained on the rear face of the moving piston, even though the driver may have released the braking force in part.

Yet, the servomotor of the previously described type has the disadvantage, unlike a servomotor without a unidirectional clutch device, of requiring, as it is manufactured, the separate machining of a sleeve and of a finger, since the axial fixing of the sleeve in position is ensured but in a rather inaccurate manner.

As a matter of fact, since the key locks the sleeve simply by wedging, that is through a very small contact area, not to say an almost pinpoint one, between an edge of a circular opening made in the key and the periphery of the sleeve, the sleeve is likely to slip when the key comes into contact with it.

If the key is not correctly positioned on the sleeve, in a full-braking operation, one incurs the risk that, if the finger is made in one piece with the sleeve, the sleeve may be locked in a position in which its finger would not bias the reaction disk, integral with the moving piston.

In order to cope with said difficulty, the present invention provides a one-piece design for the sleeve and the finger, associated with reliable means for an accurate fixing of the sleeve in position.

Therefore, it is the object of the present invention to provide a servomotor of the above-described type, characterised in that the finger is axially integral with the sleeve, and in that means are provided for an axial indexing of the locking position of the sleeve.

According to other features of this invention:

the finger and the sleeve are manufactured as a single piece from the same material;

the sleeve comprises a finger-forming front free end section, which is slidably fitted within a complementary front bore of the piston;

the sleeve has an intermediate cylindrical section having a greater diameter than the front free end section of the sleeve and which is slidably fitted within a complementary rear bore of the piston;

resilient means are mounted between a radial shoulder on the piston, defining the front and rear bores, and a front shoulder on the sleeve, which defines the front end section and the intermediate section, so as to return the sleeve axially rearwards in abutment against the plunger;

the resilient return means comprise a compression helical spring, arranged on the front end cylindrical section of the sleeve;

the plunger is slidably fitted inside a hole made in the sleeve, a bottom front face of which provides the axial support for the plunger in the end actuation position of the control rod;

the sleeve includes at least one locking transverse face, axially facing rearwards so as to constitute a stop for a peg provided on the key and extending radially towards the sleeve, for an axial indexing of the end locking position of the sleeve;

the sleeve has a cylindrical shape with a substantially constant diameter and it comprises a radial groove exhibiting a substantially truncated-cone-shaped profile, a shoulder-forming front transverse face constituting the locking transverse face;

the key has, in an axial sectional view, the shape of a tee, the vertical branch of which is substantially radially directed and traversed by the sleeve, whereas its horizontal branch bears the peg, which protrudes from the front part and has the shape of a concave truncated-cone-shaped angular sector, which is complementary to the truncated-cone-shaped profile of the groove in the sleeve, said branch being shaped, at both ends, into an arc of a cylinder so as to be received, without any axial clearance, between two walls of a cavity traversing the piston, perpendicularly to its axis, so as to allow but a rocking motion of the key inside the cavity, the key being further resiliently biased against the rear wall of the cavity.

Other features and advantages of the present invention will be apparent from the following detailed description, by way of example and by no means as a limitation, when taken in conjunction with the accompanying drawings, in which.

In the following description, the same reference numerals will designate the same elements, or elements having similar functions.

As a rule, the terms "front", "rear", "upper" and "lower" refer respectively to elements or positions facing leftward, rightward, upward or downward in the figures.

Figure 1:
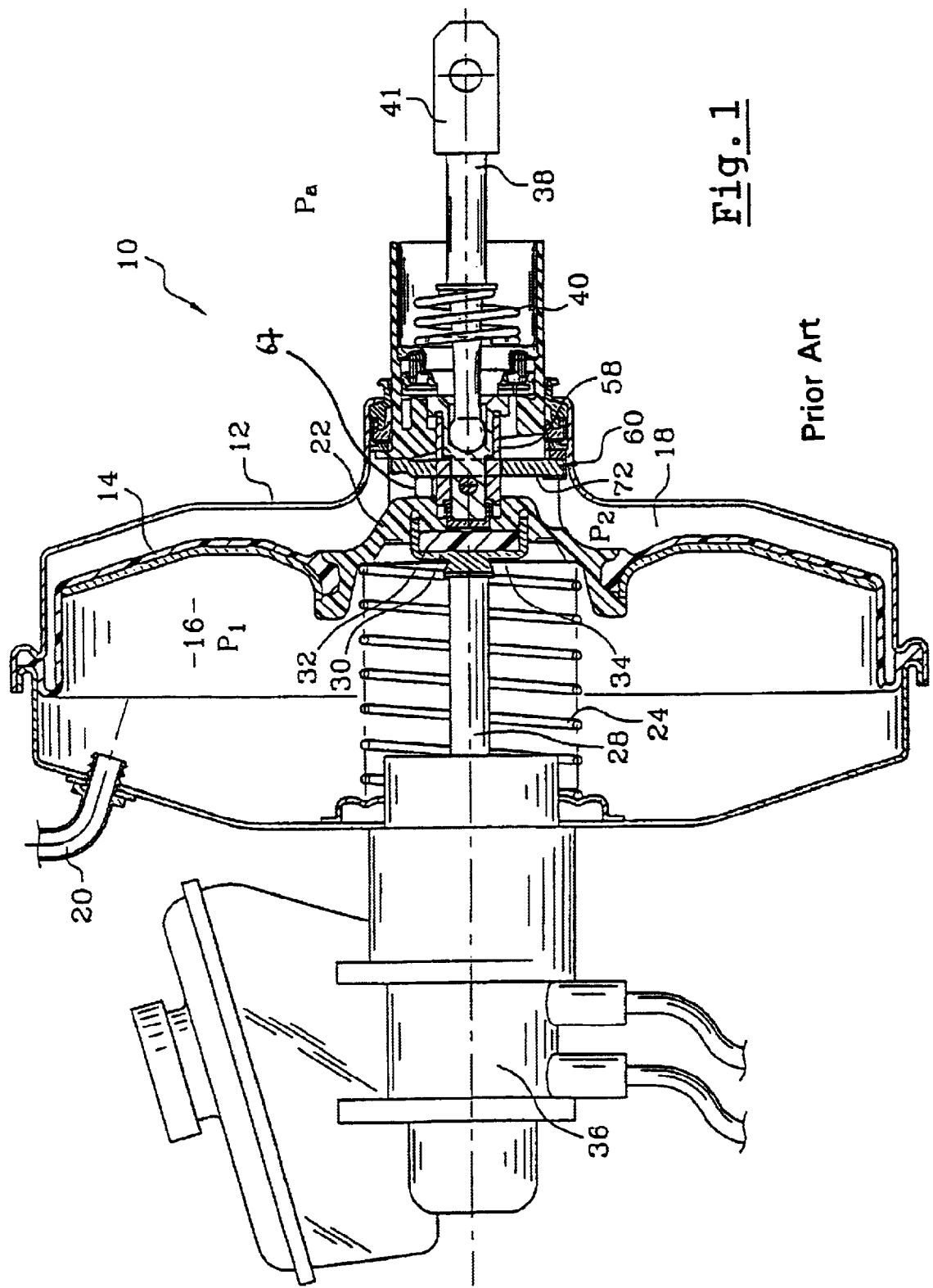
FIG. 1 is an overall axial sectional view, showing a pneumatic servomotor for an assisted braking according to the prior art.

FIG. 1 illustrates a conventional pneumatic servomotor 10 for an assisted braking of a motor vehicle.

In a well-known manner, the pneumatic servomotor 10 comprises a rigid casing 12, in which a transverse partition wall 14 is movably mounted, so as to define therein, in an airtight manner, a front chamber 16 under a first pressure "$P_1$", the value of which is equal to the negative pressure value of the vehicle engine, and a rear chamber 18 under a second pressure "$P_2$". Said second pressure "$P_2$" may vary between the engine negative pressure value "$P_1$" and the atmospheric pressure "$P_a$" as will be further explained hereunder.

The front chamber 16 is supplied with the pressure "$P_1$" through a negative-pressure pipe 20, connected to a vacuum source of the vehicle, for instance a negative pressure prevailing in an inlet manifold (not shown) of a vehicle engine.

The pneumatic servomotor 10 comprises a moving piston 22, integral with the moving partition wall 14. Inside the casing 12, the moving partition wall 14 is resiliently returned by a return spring 24, which rests on the casing 12 and on a front face 26 of the moving piston 22. The front face 26 of the moving piston 22 carries a reaction cup 30, in which a reaction disk 32, made of an elastomeric material, is accommodated in a manner to be described below. The front face 34 of the reaction cup 30 is integral with an actuating rod 28, which therefore travels with the moving piston 22, for the actuation of a hydraulic-brake master cylinder 36 of the vehicle.

A control rod 38, e.g. connected to the brake pedal of the vehicle through a coupling sleeve 41, arranged at its free rear end, may selectively travel within the moving piston 22, as a function of an input axial force, applied to the control rod 38 in the forward direction. The actuation force is exerted against a return force, applied to the rod 38 by a return spring 40, arranged between the moving piston 22 and the control rod 38.

The front end of the control rod 38, facing in the opposite direction to the free end, is shaped into a toggle 42, received in a housing 44 having a complementary shape and provided in a substantially cylindrical plunger 46, which is slidably mounted in the moving piston 22.

A rear annular seat 48 of the plunger 46 belongs to a three-way valve 50, capable of varying the second pressure "$P_2$", prevailing in the rear chamber 18, more particularly by connecting the front chamber 16 with the rear chamber 18 when the control rod 38 is in the rest position, or by gradually subjecting the rear chamber 18 to the atmospheric pressure "$P_a$" when the control rod 38 is actuated.

Since the mode of operation of the three-way valve 50 is known from the state of the art, it will not be further described herein.

In a well-known manner, a finger 52 is slidably fitted both on the front end of the plunger 46, in the opposite direction to the housing 44, and inside a bore 54 provided in the moving piston 22 and opening facing the reaction cup 30. Therefore, the finger 52 is capable of being biased by the plunger 46 so as to bias, in turn, the reaction disk 32 and compress it, and thus the reaction force of the moving piston 22 is transferred onto the plunger 46 and, in consequence, onto the control rod 38, in an end-of-stroke actuating position of the control rod 38.

Figure 2:
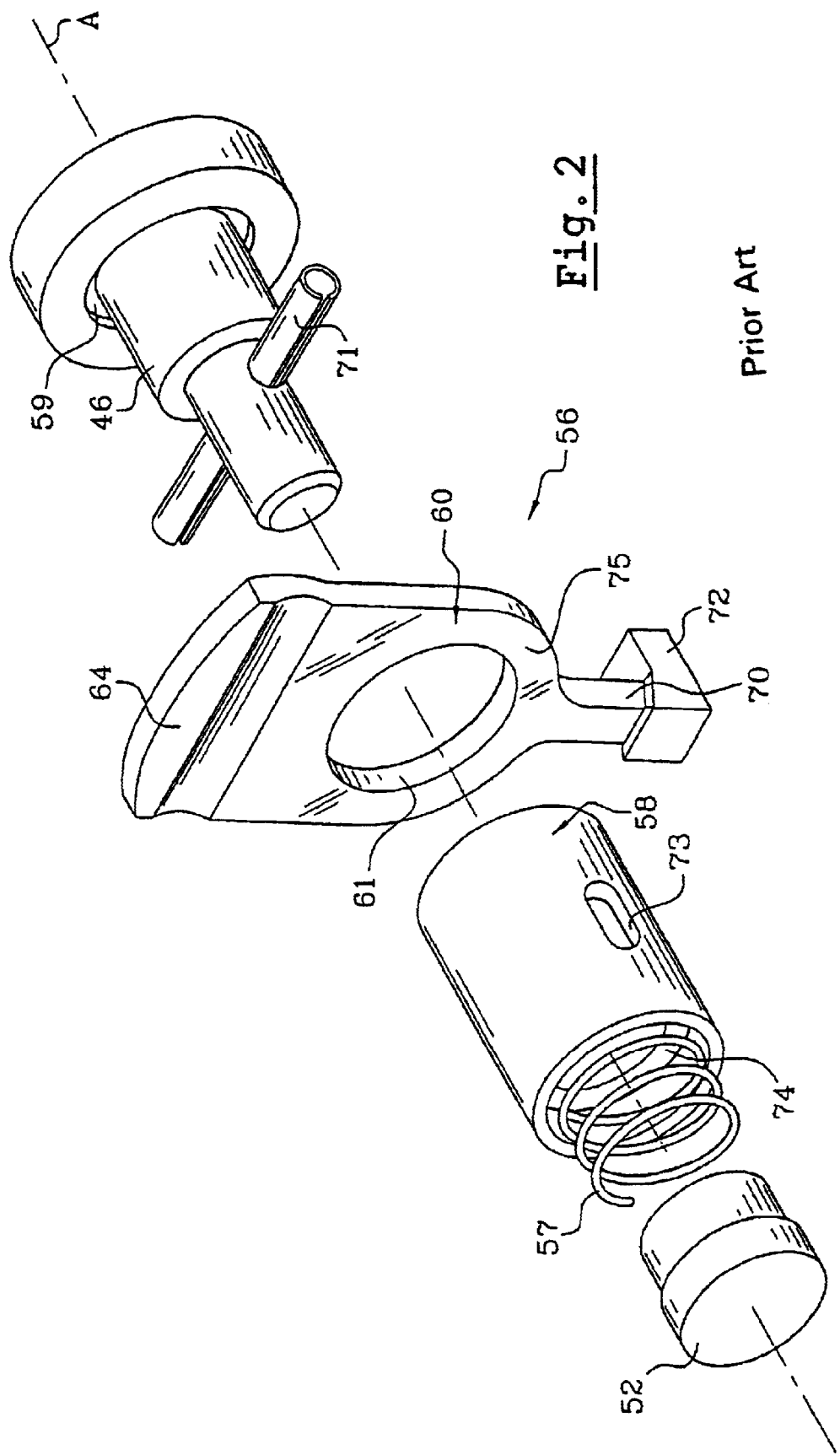
FIG. 2 is a detail perspective exploded view of the finger, the sleeve, the key and the plunger of the servomotor shown in FIG. 1.

As is well known too, and as shown in FIG. 1 and, more particularly, in FIG. 2, the servomotor 10 includes a unidirectional clutch device 56, comprising, on the one hand, a coaxial sleeve 58 sliding on the plunger 46 and resiliently returned through a spring 57, which is arranged between the piston 22 and the sleeve 58, into contact with a shoulder-forming face 59 of the plunger 46, and comprising, on the other hand, a substantially ring-shaped key 60, fitted around the sleeve 58 with a radial clearance. More particularly, when the servomotor 10 is in the assembled state, the sleeve 58 passes through a circular opening 61, made in the key 60.

FIG. 1 shows that the key 60 is received within a cavity 62, traversing the piston 22 perpendicularly to its axis A.

An upper part 64 of the key 60 is resiliently biased into abutment against a rear wall 66 of the cavity 62, by means of a return spring 67, arranged between a front wall 68 of the cavity 62 and the upper part 64 of the key 60.

In the rest position, a lower part 70 of the key 60 bears on a support 72 provided on the casing 12 of the servomotor 10. A transverse pin 71, extending through an opening 73 cut in the sleeve 58 and the plunger 46, bears, in the rest position of the control rod 38, on a front face 75 of the key 60 so as to define the rest position of the plunger 46.

In that way, when an input force is applied in the forward direction, in accordance with a full stroke of the control rod 38, especially at a determined speed of the latter, the upper part 64 of the key 60 is driven by the piston 22, whereas its lower part 70 separates from the support 72. It results in that the key 60 rocks about a generally transverse axis anti-clockwise so as to cooperate with the periphery of the sleeve 58.

As long as such travel of the control rod 38 is continuing and as long as the latter drives the sleeve 58, through the shoulder-forming face 59, the force, exerted on the control rod 38, is enough to prevent the complete locking of the sleeve 58, since such force is higher than that applied by the spring 67 onto the key 60.

On the other hand, if the driver releases the force exerted on the control rod 38 too soon, the sleeve 58 is locked by the key 60 in an end front axial position, in which an annular bearing surface 74 at the front end of the sleeve locks the finger 52, independently of the plunger and the control rod, which means that a maximum braking force is maintained as long as the return of the control rod 38 does not cause the three-way valve 50 to reopen and, consequently, the piston 22 to move backwards in the return direction.

However, in such design, the servomotor 10 has the disadvantage of requiring, as it is manufactured, the separate mounting of a sleeve 58 and of a finger 52, which have been separately machined, since the axial fixing of the sleeve 58 in position is ensured but in a rather inaccurate manner by the key 60 in the end actuation position of the sleeve 58.

As a matter of fact, if the key 60 is not correctly positioned along the sleeve 58, in a full-braking operation, one incurs the risk that, if the finger 52 is integral with the sleeve 58, which would be the case more particularly if the finger 52 has been made in one piece with the sleeve 58 from the same material or fastened to the sleeve, the sleeve 58 may be locked in a position in which its front end annular bearing surface 74 would not bear on the finger 52. Therefore the finger 52 would not bias the reaction disk 32, integral with the moving piston 22.

It is the reason why, in a well-known manner, the finger 52 and the sleeve are independent of each other.

Yet such a design is much more expensive than a design according to which the finger 52 is integral with the sleeve 58, since, in the present case, said elements must then be mounted in a separate manner.

In order to cope with said difficulty, the present invention provides a new design for the servomotor 10, in which the finger 52 is axially integral with the sleeve 58, and in which means are jointly provided for an axial indexing of the locking position of the sleeve 58.

In a first embodiment (not shown), the finger 52 can be manufactured independently of the sleeve 58 and fastened to it afterwards. In a second embodiment, the finger and the sleeve 58 are manufactured as a single piece from the same material, i.e. a "monobloc" design.

In that way, the manufacturing of the servomotor 10 is much less expensive than that of the servomotor 10 of the above-described type, since there is only one mounting operation for both the sleeve 58 and the finger 52. Such configuration does not require either the above-mentioned return spring 57.

Figure 3:
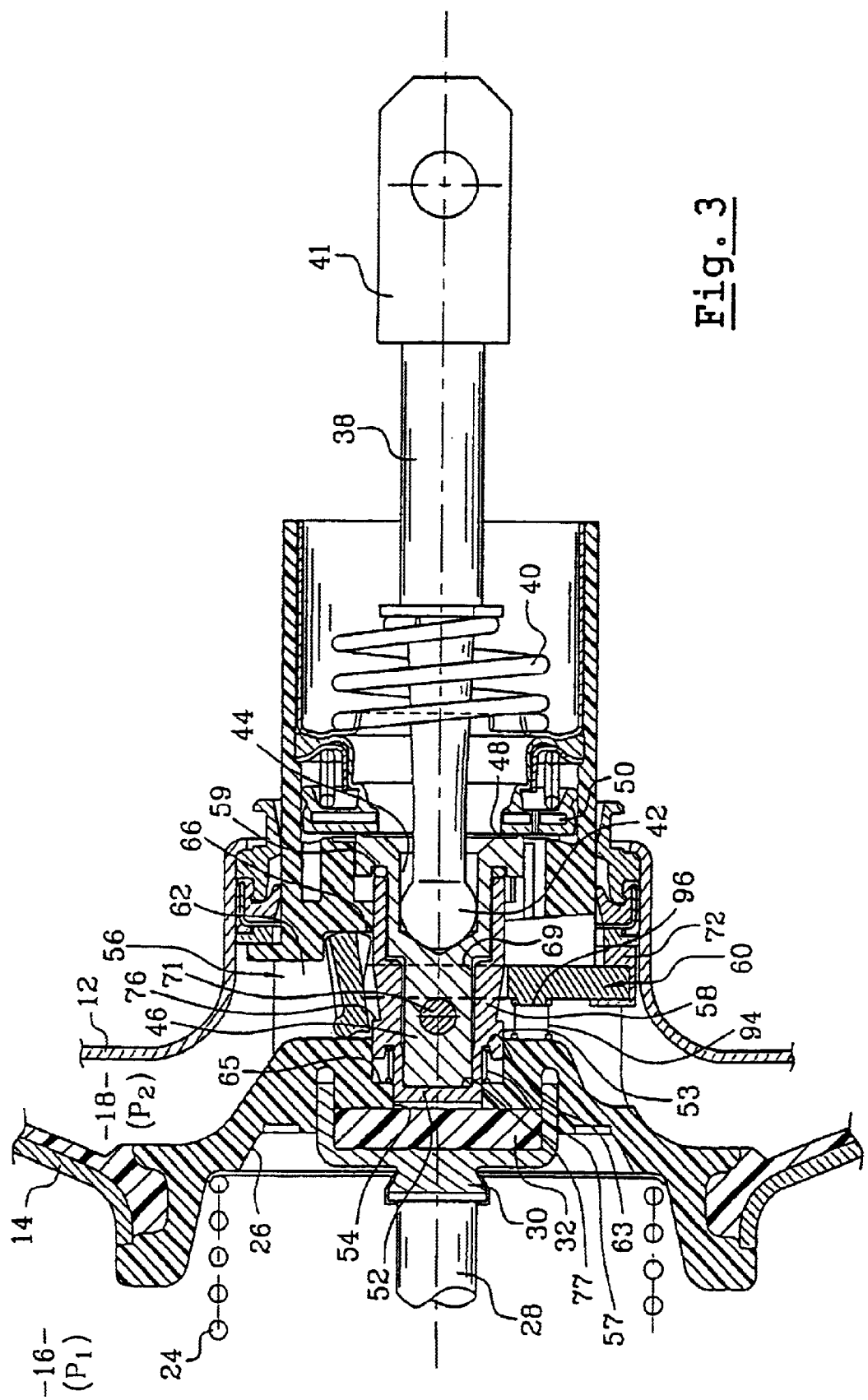
FIG. 3 is a detail axial sectional view, showing a pneumatic servomotor for an assisted braking according to the present invention and in the rest position.

As shown in FIG. 3, in the second embodiment of the present invention, which actually is the preferred embodiment of the invention, the finger 52 and the sleeve 58 are manufactured as a single piece from the same material. Such configuration permits a further lowering of the manufacturing cost of the servomotor 10, since the sleeve 58 and the finger 52 are accurately obtained in one machining operation only.

As a matter of fact, in this configuration, the sleeve 58 comprises a finger-forming front free end section 52, which is slidably fitted in the bore 54 of the moving piston 22, opening facing the reaction cup 30.

Besides, the sleeve 58 has an intermediate cylindrical section 53 having a greater diameter than the finger-forming front free end section 52, arranged rearwardly of said section 52 of the sleeve and slidably fitted within a complementary rear bore 55 of the piston. The rear bore 55 is coaxial with the bore 54.

The front bore 54 and the rear bore 55 are defined by a radial shoulder 65. Resilient means are mounted in the compressed state between the radial shoulder 59 on the piston 22 and a front shoulder 63 on the sleeve, which defines the front end section 52 and the intermediate section 53, so as to return the sleeve 58 axially rearwards into abutment against the shoulder-forming face 59 of the plunger 46, along which it can slide.

In the preferred embodiment according to the present invention, the resilient means consist of a compression helical spring 57, arranged on the finger-forming front end cylindrical section 52 of the sleeve 58.

However such arrangement is by no means restrictive and the compression helical spring 57 could just as well be replaced by a stack of spring washers (not shown) with an appropriate size.

Similarly to the preceding embodiment, the plunger 46 is slidably fitted inside a hole 69 made in the sleeve, a bottom front face 77 of which provides the axial support for the plunger 46 in the end actuation position of the control rod 38.

In that way, the front section 52 of the sleeve 58 is capable of biasing the reaction disk 32 of the piston 22 and of maintaining such biasing action when the sleeve 58 is locked in an adequate axial position by the key 60.

To this end, the present invention provides for means, in particular a unidirectional clutch device 56, for an axial indexing of the locking position of the sleeve 58.

Figure 4:
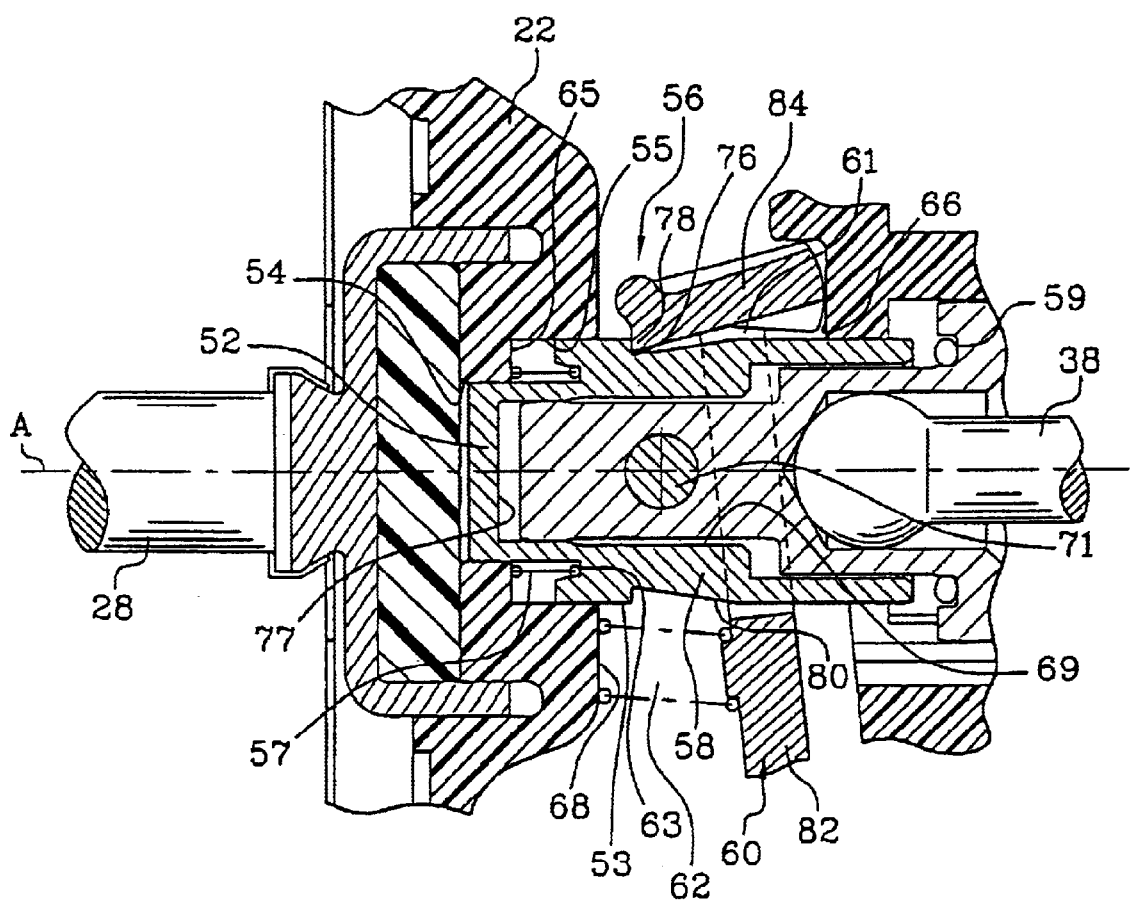
FIG. 4 is a detail axial sectional view, near the plunger, the sleeve and the key, of the servomotor shown in FIG. 3, and represented in the locking position of the sleeve.
Figure 5:
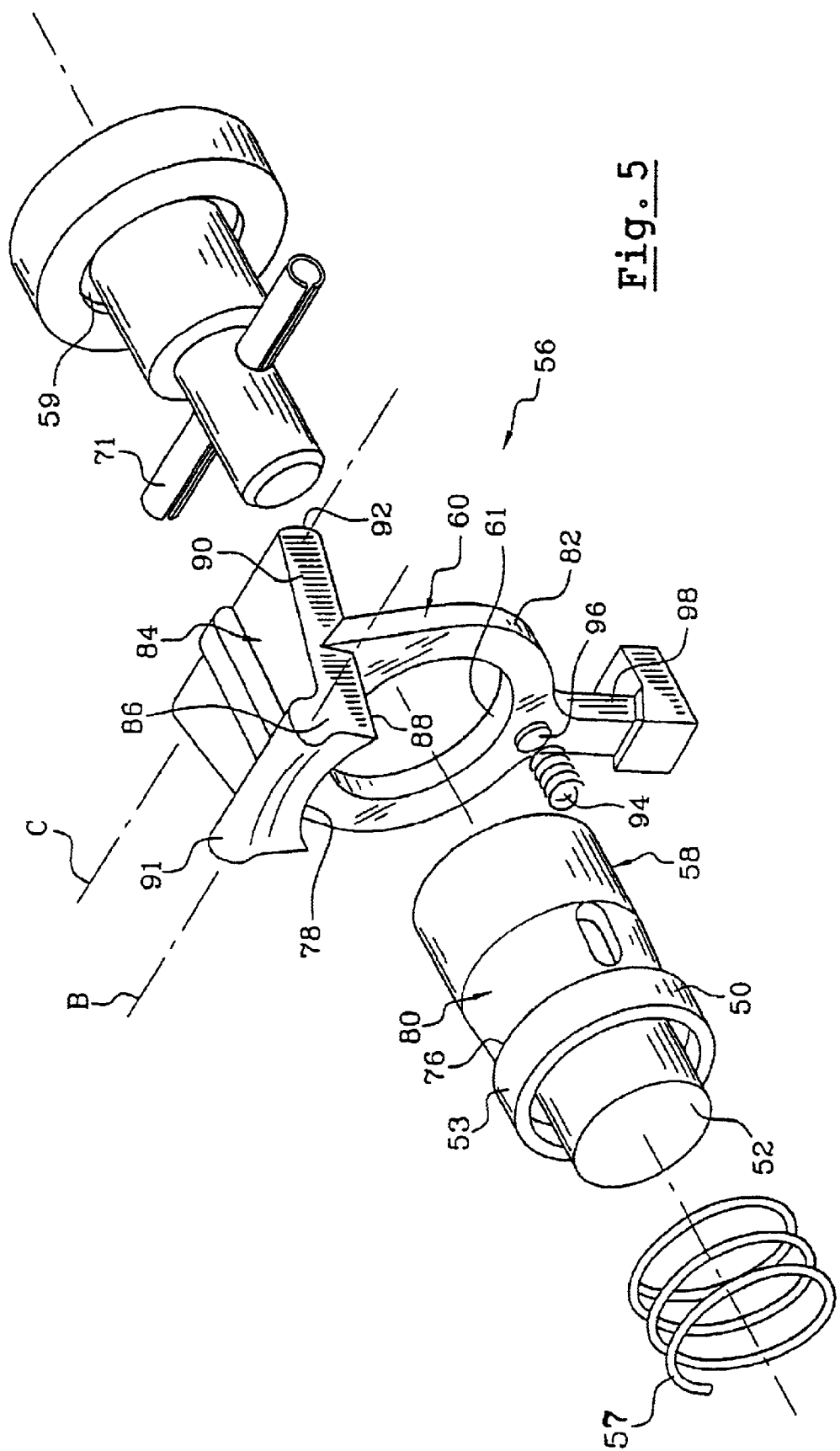
FIG. 5 is a detail perspective view of the plunger, the sleeve and the key of the servomotor of FIG. 3.

With this object in view, according to the invention and as shown in more detail in FIGS. 4 and 5, the unidirectional clutch device 56 comprises at least one transverse face 76 for the locking of the sleeve 58, said face being arranged rearwardly of the intermediate section 53 and facing axially rearwards so as to form a stop for a peg 78 provided on the key 60 and extending radially towards the sleeve 58, for an axial indexing of the end locking position of the sleeve 58.

For this purpose, the sleeve 58 comprises, rearwardly of the intermediate section 53, a radial groove 80. The shoulder-forming face, which is defined by the groove 80 and the intermediate section 53, constitutes the locking transverse face 76.

In an advantageous way, as shown in FIGS. 4 and 5, the groove 80 has a substantially truncated-cone-shaped profile rearwardly of the shoulder-forming front transverse face 76. It results in that the end of the groove 80, opposite the shoulder-forming front transverse face 76, gradually merges into the cylindrical periphery of the rear part of the sleeve 58.

The truncated-cone shape of the groove 80, made in the sleeve 58, is particularly advantageous in that, on the rocking of the key 60, its peg 78 can be guided, said peg having the shape of a concave truncated-cone-shaped angular sector, complementary to the truncated-cone-shaped profile of the groove 80, up to its resting position against the shoulder-forming front face 76 of the sleeve 58.

Similarly to the key, which has been previously described with reference to FIG. 1, the key 60 includes a circular opening 61 surrounding the sleeve 58. But, as opposed to the above-described key 60 with reference to FIG. 1, the edge of said opening 61 does not take part in the locking of the sleeve 58.

As a matter of fact, as shown more especially in FIG. 4, the key 60 has, in an axial sectional view, the general shape of a tee, the vertical branch 82 of which is substantially radially directed and includes the opening 61, which is traversed by the sleeve 58. The tee key 60 comprises a horizontal branch 84, which is substantially axially directed, perpendicularly to the main branch 82 and which is received, without any axial clearance, between the front wall 68 and the rear wall 66 of the cavity 62 traversing the piston 22, perpendicularly to the axis A of the latter.

Such configuration offers the advantage of allowing only a rocking motion of the key 60 inside the cavity 62. As a matter of fact, the key 60 cannot move axially in relation to the cavity 62 but yet its branch 84 can rock into the cavity 62.

As illustrated in FIG. 5, the horizontal branch 84 of the tee key 60 carries the peg 78. More particularly, the front horizontal half-branch 86 of the tee key has a face 88 which radially faces the sleeve and from which the peg protrudes.

Moreover, the front end of the front half-branch 86 of the tee key 60 is shaped into a convex arc 91 of a cylinder in the direction of an axis B, orthogonal to the axis A of the piston 22, so as to bear against the front transverse wall 68 of the cavity. This arc 91 of a cylinder makes it possible, in particular, for the half-branch 86 to slide easily along the front transverse wall 68 of the cavity 62.

In a similar way, the rear end of the rear half-branch 90 of the tee key is shaped into a convex arc 92 of a cylinder in the direction of an axis C, orthogonal to the axis A of the piston 22, so as to slide along the rear transverse wall 66 of the cavity 62. This arc 92 of a cylinder makes it possible, in particular, for the half-branch 90 to slide easily along the rear transverse wall 66 of the cavity 62, on the rocking of the key 60. Such configuration is illustrated in more detail in FIG. 5.

As shown in FIGS. 3, 4 and 5, the key 60 is mounted in the cavity 62 substantially similarly to the above-described key 60, with this difference that the tee key 60 according to this invention is resiliently biased against the transverse wall 66 of the cavity by a return spring 94, arranged between the front transverse wall 68 of the cavity 62 and a centering spigot 96, provided on the tee key 60 and protruding from a lower part 98 of the vertical branch 82 of the tee, on the opposite side relatively to the peg 78.

It results in that, when no force is exerted on the control rod 38, the key 60 is located as represented in FIG. 3, its horizontal branch 84 being substantially parallel to the axis A of the piston 22, whereas its vertical branch 82 is substantially perpendicular to said axis A.

When the driver actuates the control rod 38 at a comparatively low speed, which corresponds to a gradual braking operation, the moving piston 22 travels substantially at the same speed as the plunger 46, since the atmospheric pressure "$P_a$" becomes progressively established as the three-way valve 50 opens. In this configuration, owing to the fact that the horizontal branch 84 is retained between the front wall 68 and the rear wall 66 of the cavity without any possibility of an axial motion, the key 60 rocks as soon as the vertical branch 82 of the key separates from the support 72 integral with the casing 12. Then the peg 78 comes into contact with the sleeve 58, at the periphery of the intermediate section 53, but it does not engage the truncated-cone-shaped groove 80.

Therefore, if the driver releases the braking force, the key 60 does not lock the sleeve 58 and it does not either oppose the front-to-rear travel of the moving piston 22.

On the other hand, if the driver pulls violently the control rod 38, which corresponds to an emergency braking situation, the plunger 46 moves forward faster than the moving piston 22 does, owing to the delay involved in the equalization of the pressure in the rear chamber 18. As a result, when the key 60 rocks, the peg 78 is received in the groove 80 and it slides in it till it abuts against the shoulder-forming face 76, as illustrated in FIG. 4.

Then, if the driver releases somewhat the braking force, the key 60 locks the sleeve 58 and, therefore, the finger-forming front section 52 of the latter. It results in that the sleeve 58 opposes the return travel of the piston 22, independently of the position of the plunger 46. Such position ensures the maintaining of a maximum braking force on the piston 22.

When the driver releases the braking force to a great extent, the return motion of the control rod 38 actuates the plunger 46, the pin 71 of which biases the vertical branch 82 of the key 60 in the front-to-rear direction, which results in the unlocking of the key 60. Besides, the return of the plunger 46 causes the three-way valve 50 to open. The re-evacuation of the rear chamber 18 makes the piston 22 travel and therefore the key 60 is brought back to its rest position, since its horizontal branch 84 is guided between the front wall 68 and the rear wall 66 of the cavity 62.

As appears from the foregoing, the axial position of the shoulder-forming face 76 in relation to the sleeve 58 is decisive in the operation of the servomotor 10. As a matter of fact, it is the axial position of the shoulder-forming face 76 which allows the sleeve 58 to be locked in a given axial position, for the finger-forming front section 52 to bear on the reaction disk 32 and thus for the maintaining of a maximum braking force.

Therefore, in an advantageous manner, the present invention gives the benefit of a maximum braking force in emergency braking situations, whatever the driver's behaviour may be following the jamming on of the brakes.

What is claimed is:

1. A pneumatic servomotor (10) for an assisted braking of a motor vehicle comprising a rigid casing (12) in which a transverse partition wall (14) is movable in an airtight manner to define a front chamber (16) under a first engine negative pressure ($P_1$), and a rear chamber (18) under a second pressure ($P_2$) that varies between said engine negative pressure ($P_1$) and the atmospheric pressure ($P_a$); a moving piston (22) integral with said moving partition wall (14), and a control rod (38) that moves inside the piston (22) in a selective manner as a function of an axial input force, said input force being exerted in the forward direction against a return force applied to said control rod (38) by a return spring (40); said control rod (38) being biased towards an intermediate actuation position and an end actuation position resulting from the applying of the input force at a determined high speed; a plunger (46) arranged at a front part of said control rod (38) inside said piston (22), and a three-way valve (50), including at least an annular seat (48) borne by a rear section of said plunger (46), and capable of varying the second pressure ($P_2$), prevailing within said rear chamber (18), particularly by connecting said front chamber (16) with the rear chamber (18) when said control rod (38) is in a rest position and by gradually connecting said rear chamber (18) with the atmospheric pressure ($P_a$) when said control rod (38) is actuated; said control rod (38) having a finger (52) which slidingly engages the front end of said plunger (46) and is biased by the plunger (46) into contact with a reaction disk (32) that is integral with the rear face of said moving piston (22), so as to transmit a reaction force of said moving piston (22) to said plunger (46) and control rod (38); and a unidirectional clutch device (56), which includes a coaxial sleeve (58), sliding on the plunger (46), and a substantially ring-shaped key (60), arranged with a given clearance around the sleeve (58) and being driven by moving piston (22) when an input force is applied at said determined speed causing said key (60) to rotate on a generally transverse axis in order to cooperate with the periphery of the sleeve (58) and lock said key in an end front axial position, in which said key locks said finger (52), independently of said plunger (46) and control rod (38), characterised in that said finger (52) is axially integral with said sleeve (58) and in that means are provided for axial indexing of locking positions of the sleeve (58).

2. The pneumatic servomotor (10) according to claim 1, characterised in that said finger (52) and sleeve (58) are manufactured as a single piece from the same material.

3. The pneumatic servomotor (10) according to claim 2, characterised in that said sleeve (58) comprises a finger-forming front free end section (52), which is slidably fitted within a complementary front bore (54) of said piston (22).

4. The pneumatic servomotor (10) according to claim 3, characterised in that said sleeve (58) has an intermediate cylindrical section (53) having a greater diameter than said front free end section (52) of said sleeve (58) and which is slidably fitted within a complementary rear bore (55) of said piston (22).

5. The pneumatic servomotor (10) according to claim 4, characterised in that resilient means are mounted between a radial shoulder (65) on said piston (22), defining the front bore (54) and the rear bore (55), and a front shoulder (63) on said sleeve, which defines the front end section (52) and the intermediate section (53), so as to urge said sleeve (58) axially rearwards into abutment against said plunger (46).

6. The pneumatic servomotor (10) according to claim 5, characterised in that said resilient return means comprise a compression helical spring (57), arranged on the front end cylindrical section (52) of said sleeve (58).

7. The pneumatic servomotor (10) according to claim 6, characterised in that said plunger (46) is slidably fitted inside a hole (69) made in the sleeve (58), a bottom front face (77) of which provides the axial support for said plunger (46) in the end actuation position of said control rod (38).

8. The pneumatic servomotor (10) according to claim 4, characterised in that said sleeve (58) includes at least one locking transverse face (76), axially facing rearwards so as to constitute a stop for a peg (78), provided on said key (60) and extending radially towards said sleeve (58), for an axial indexing of the end locking position of said sleeve (58).

9. The pneumatic servomotor (10) according to claim 8, characterised in that said sleeve (58) has a cylindrical shape with a substantially constant diameter a radial groove (80) exhibiting a substantially truncated-cone-shaped profile and a shoulder-forming front transverse face (76) of which constitutes said locking transverse face.

10. The pneumatic servomotor (10) according to claim 9, characterised in that said key (60) has, in an axial sectional view, the shape of a tee, the vertical branch (82) of which is substantially radially directed and traversed by said sleeve (58), whereas its horizontal branch (84) bears said peg (78), which protrudes from the front part and has the shape of a concave truncated-cone-shaped angular sector, which is complementary to the truncated-cone-shaped profile of said groove (80) in said sleeve (58), said branch being shaped, at both ends, into an arc (91, 92) of a cylinder so as to be received, without any axial clearance, between two walls (66, 68) of a cavity (62) traversing said piston (22), perpendicularly to its axis (A), so as to allow but a rocking motion of said key (60) inside the cavity (62), said key (60) being further resiliently biased against the rear wall (66) of said cavity (62).

* * * * *